United States Patent
Lutz et al.

Patent Number: 5,713,427
Date of Patent: Feb. 3, 1998

[54] HYBRID DRIVE IN A MOTOR VEHICLE

[75] Inventors: Dieter Lutz, Schweinfurt; Franz Nagler, Gädheim-Ottendorf, both of Germany

[73] Assignee: Fichtel & Sachs AG, Schweinfurt, Germany

[21] Appl. No.: 823,890

[22] Filed: Mar. 17, 1997

Related U.S. Application Data

[63] Continuation of Ser. No. 383,793, Feb. 6, 1995, abandoned.

[30] Foreign Application Priority Data

Feb. 8, 1994 [DE] Germany .......................... 44 04 791.6

[51] Int. Cl.$^6$ .................................................. B60K 1/00
[52] U.S. Cl. ................................. 180/65.4; 290/1 R
[58] Field of Search ........................... 180/65.1, 65.2, 180/65.3, 65.4, 165, 1 R; 307/10.1

[56] References Cited

FOREIGN PATENT DOCUMENTS

| | | |
|---|---|---|
| 0629324 | 4/1936 | Germany . |
| 0833979 | 3/1952 | Germany . |
| 8530067 | 3/1986 | Germany . |
| 4133013 | 4/1993 | Germany . |
| 59-092740 | 5/1984 | Japan . |
| 5060147 | 3/1993 | Japan . |
| 2043208 | 10/1980 | United Kingdom . |
| 9202741 | 2/1992 | WIPO . |

*Primary Examiner*—Richard M. Camby
*Attorney, Agent, or Firm*—Nils H. Ljungman and Associates

[57] ABSTRACT

In a motor vehicle, a modular unit including an internal combustion engine with an engine housing and a crankshaft for power take-off, and an electric generator/motor, the generator housing of which is permanently connected to the engine housing, and the rotor of which is coaxially and non-rotationally connected to the crankshaft. According to at least one preferred embodiment of the present invention, the modular unit is characterized by the fact that there is an elastically deformable torque transmission plate which is permanently connected by means of a flange to the driven end of the crankshaft, and is permanently connected on the circumferential side to the rotor, and that the rotor is rotationally mounted in the generator housing.

17 Claims, 5 Drawing Sheets

HYBRID DRIVE IN A MOTOR VEHICLE

This application is a continuation of U.S. patent application Ser. No. 08/383,793, filed on Feb. 6, 1995, now abandoned which claims priority from Fed. Rep. of Germany Patent Application No. P 44 04 791.6, filed on Feb. 8, 1994.

BACKGROUND OF THE INVENTION

1. Field of the Invention

The present invention generally relates to a hybrid drive in a motor vehicle. Such a hybrid drive can be in the form of a modular unit and can include an internal combustion engine with an engine housing and a crankshaft for the power take-off, torsional power take-off, or starting power take-off, and an electric generator/motor, the generator housing of which is permanently connected to the engine housing, and the rotor of which is coaxially and non-rotationally connected to the crankshaft.

2. Background Information

In the context of the present invention, the term "generator" is, with relation to at least one preferred embodiment, not used in its conventional sense, i.e. it does not necessarily refer to an electric generator which has only a small power compared to the rated power of the internal combustion engine. Rather, the term "generator", as used in the context of the present invention, can refer to a unit for the generation of electric current which, as an alternative to e conventional drive train, is intended to supply the electrical drive energy to drive an electric motor which is designed to power the vehicle's drive system, and therefore has a rated power on the order of magnitude of the internal combustion engine (all-electric power transmission).

Such a drive system for motor vehicles is disclosed, for example, in German Patent Application No. 41 33 013 A1 and in VDI-Berichte 878 (1991), Page 611–622, both of which are incorporated herein by reference. The rotor of the electric generator for the generation of electric current is thereby mounted by means of a flange, or is flanged, directly to the crankshaft of the internal combustion engine, i.e. connected by means of a rigid connection. On such a modular unit which includes an internal combustion engine and generator, there is no separate bearing arrangement, or mounting, or bearing, or mounting arrangement, for the rotor in the housing of the generator. On account of the irregular running, or instability, or unsteadiness during operation which is caused by the crankshaft, and which irregularity can be expressed in particular as: a slight bending of the crankshaft from the theoretical geometric axis of rotation; displacements of the axis of rotation as a result of the wear of crankshaft bearings; and axial displacements; the air gap between the stator and the rotor of the generator should desirably be large enough to guarantee correct operation, that is, correct generator operation or engine operation (the latter if the generator is also used as a starter for the internal combustion engine). It can generally be undesirable to make the air gap between the stator and the generator rotor too large, because such an enlargement can often be accompanied by corresponding reductions in the efficiency of the generator. There can also be the additional problem that the assembly and installation of the entire unit, in particular if the rotor is designed as an external rotor motor with excitation or energization by powerful, or high-performance or efficient permanent magnets (e.g. based on the materials FeNdB or SmCo) can tend to be difficult, complex and expensive, if the generator housing with the stator inside is to be bolted on only after the attachment of the rotor by means of a flange to the crankshaft. This process can require a very precise adjustment, which in practical terms can be impossible on permanent magnet machines without special tools. Thus, problems may arise during the final assembly with regard to the amount of work involved and compliance with quality requirements, which can complicate large-scale or commercial series manufacture or series production.

OBJECT OF THE INVENTION

An object of the invention is therefore to propose a structure for a modular unit that includes an internal combustion engine and a generator, which would guarantee a high level of quality and simultaneously reduce the costs of manufacture.

SUMMARY OF THE INVENTION

The invention teaches that this object can be accomplished for a modular unit in which there is preferably an elastically deformable torque transmission plate which is permanently connected by means of a flange to the driven end of the crankshaft, and is permanently connected on the circumferential side to the rotor, wherein the rotor is preferably rotationally mounted in the generator housing. Advantageous refinements of the invention are disclosed herebelow.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a hybrid drive in a motor vehicle, the motor vehicle comprising: a chassis; a plurality of wheels being rotationally mounted on the chassis; motor means for driving the wheels to propel the motor vehicle; the hybrid drive being for powering the motor means of the motor vehicle, and the hybrid drive comprising: generator means for generating power to drive the motor means of the motor vehicle; the generator means comprising a housing and rotor means being rotationally disposed within the housing; internal combustion engine means for powering the generator means; the internal combustion engine means comprising an output shaft for transmitting power from the internal combustion engine means to the generator means; means connecting the output shaft with the generator means to transmit power from the output shaft to the rotor means; the connecting means comprising a disc being connected between the output shaft and the rotor means; and the disc being configured for minimizing, in response to non-rotational displacement of the shaft, non-rotational displacement of the rotor means.

Another aspect of the invention resides broadly in a hybrid drive for a motor vehicle, such a motor vehicle comprising: a chassis; a plurality of wheels being rotationally mounted on the chassis; motor means for driving the wheels to propel the motor vehicle; the hybrid drive being for powering the motor means of the motor vehicle, and the hybrid drive comprising: generator means for generating power to drive the motor means of the motor vehicle; the generator means comprising a housing and rotor means being rotationally disposed within the housing; internal combustion engine means for powering the generator means; the internal combustion engine means comprising an output shaft for transmitting power from the internal combustion engine means to the generator means; means connecting the output shaft with the generator means to transmit power from the output shaft to the generator means; and the connecting means being configured for minimizing, in response to non-rotational displacement of the shaft, non-rotational displacement of the rotor means.

BRIEF DESCRIPTION OF THE DRAWINGS

The present invention is explained in greater detail hereinbelow with reference to the embodiments illustrated in the accompanying figures, wherein.

DESCRIPTION OF THE PREFERRED EMBODIMENTS

Figure 1:
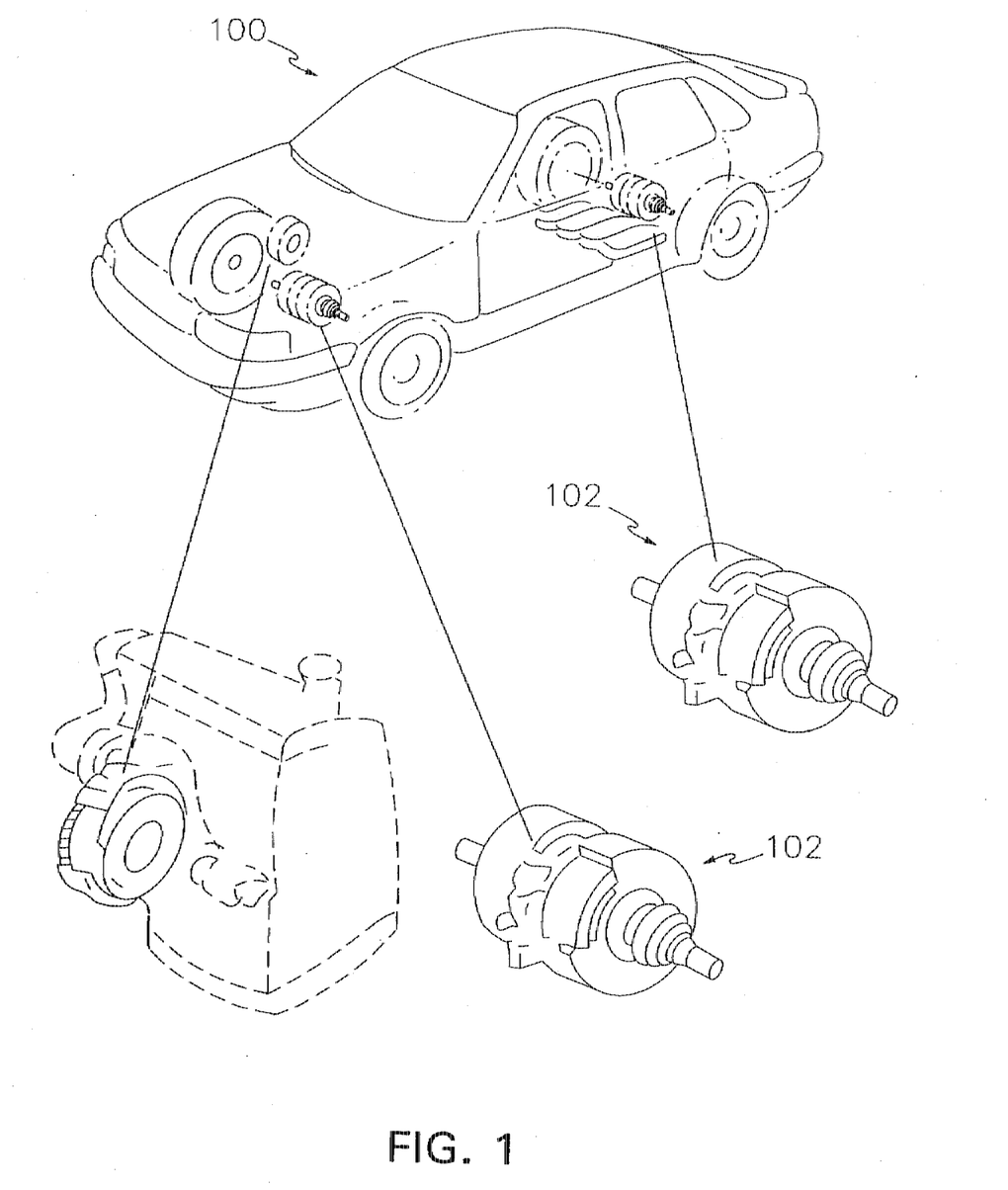
FIG. 1 illustrates a typical automobile which may employ a hybrid drive, such as an internal combustion engine-electric generator unit, in accordance with at least one preferred embodiment of the present invention.

FIG. 1 illustrates a typical automobile in which the present invention may be employed. As shown, an automobile 100 may include two electric motor arrangements, 102, wherein each such motor arrangement can conceivably include two motors for driving a corresponding wheel. It will be appreciated from the disclosure herebelow that such motor arrangements can be driven by a combination, or hybrid, internal combustion engine-electric generator.

Figure 2A:
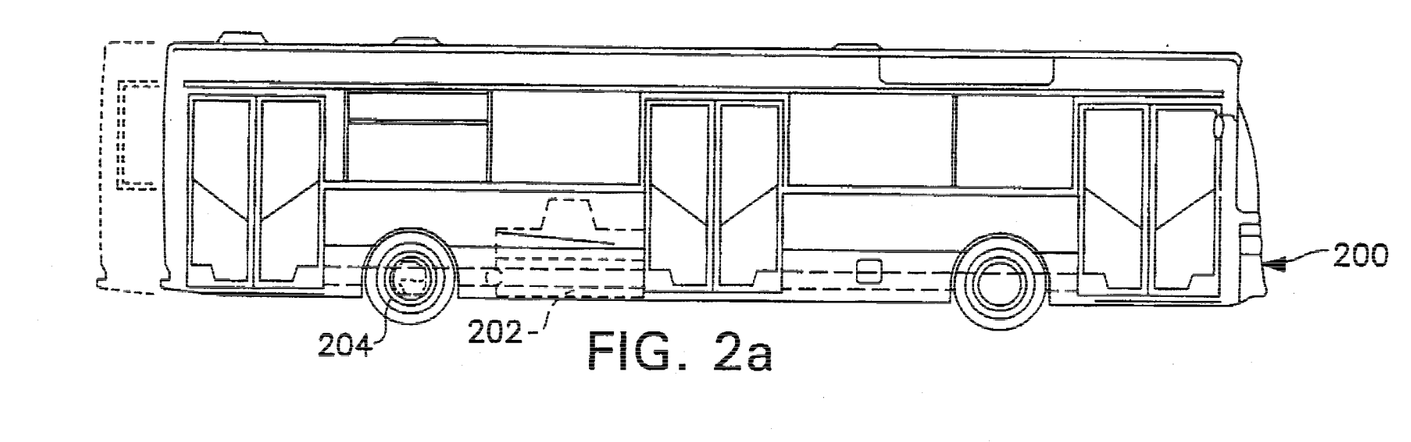
FIGS. 2a and 2b illustrate elevational and plan views, respectively, of a bus, such as an urban public transportation bus, which may employ one or more hybrid drives in accordance with at least one preferred embodiment of the present invention.
Figure 2B:
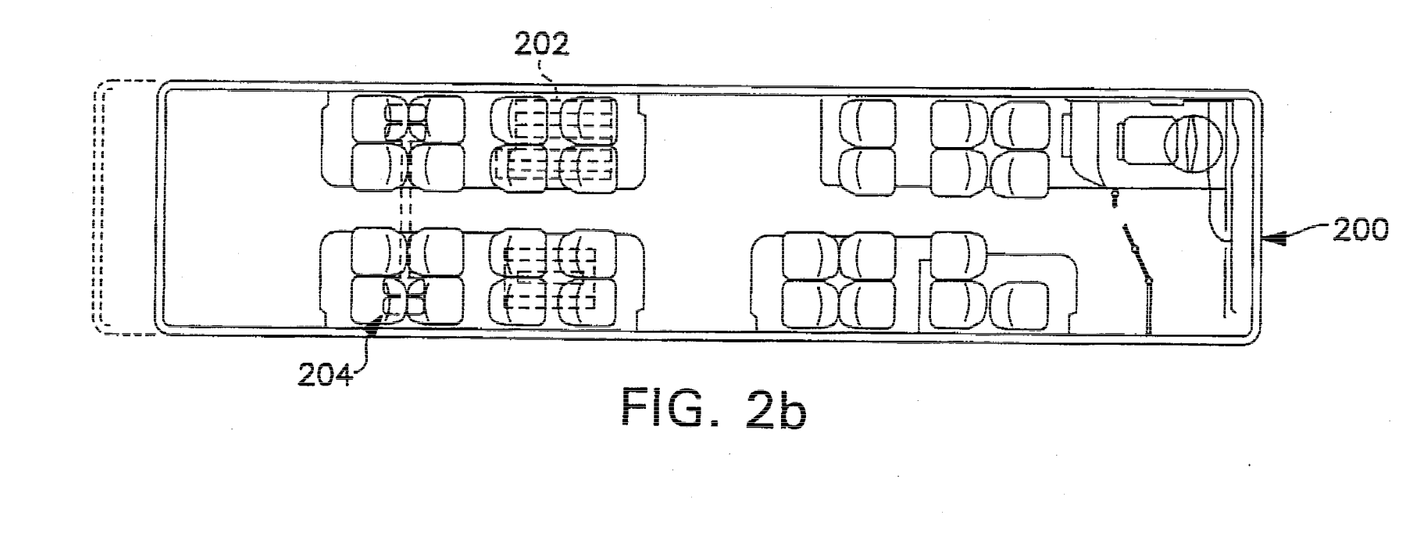

FIGS. 2a and 2b illustrate, respectively, a conventional urban transportation bus 200 in elevational and plan view, in which the present invention may be employed. Particularly, the bus 200 may include an internal combustion engine-electric generator unit 202 for powering individual motors associated with corresponding wheels or sets of wheels. In the bus 200 shown in FIGS. 2a and 2b, the internal combustion engine-electric generator unit 202 is shown as being positioned immediately forward of a rearmost set of wheels 204.

Figure 3A:
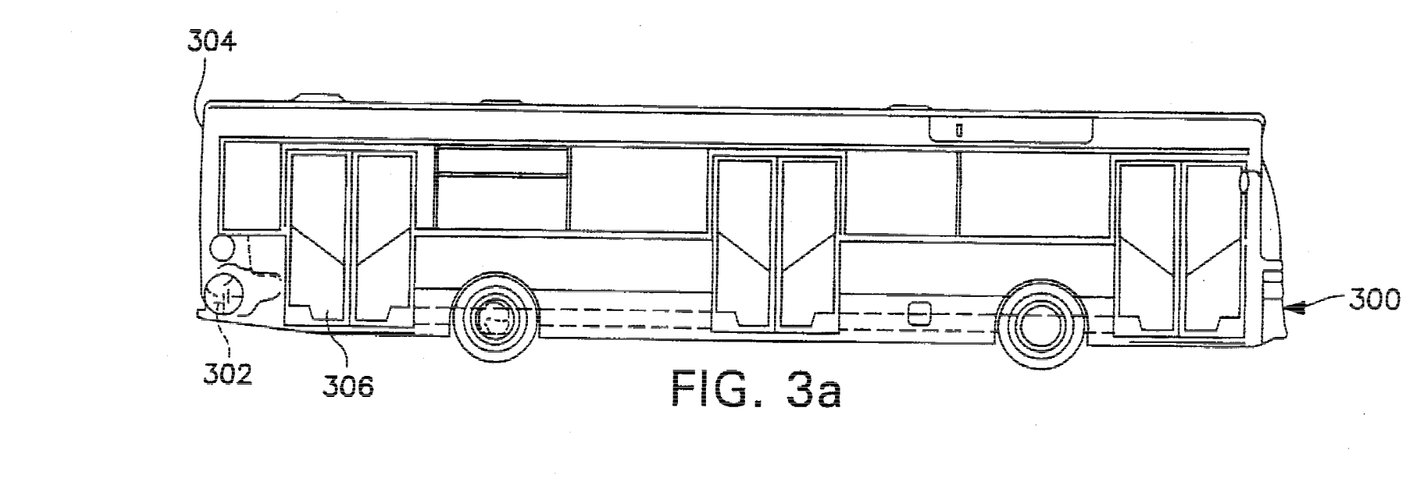
FIGS. 3a and 3b illustrate elevational and plan views, respectively, of another bus, such as an urban public transportation bus, which may employ one or more hybrid drives in accordance with at least one preferred embodiment of the present invention.
Figure 3B:
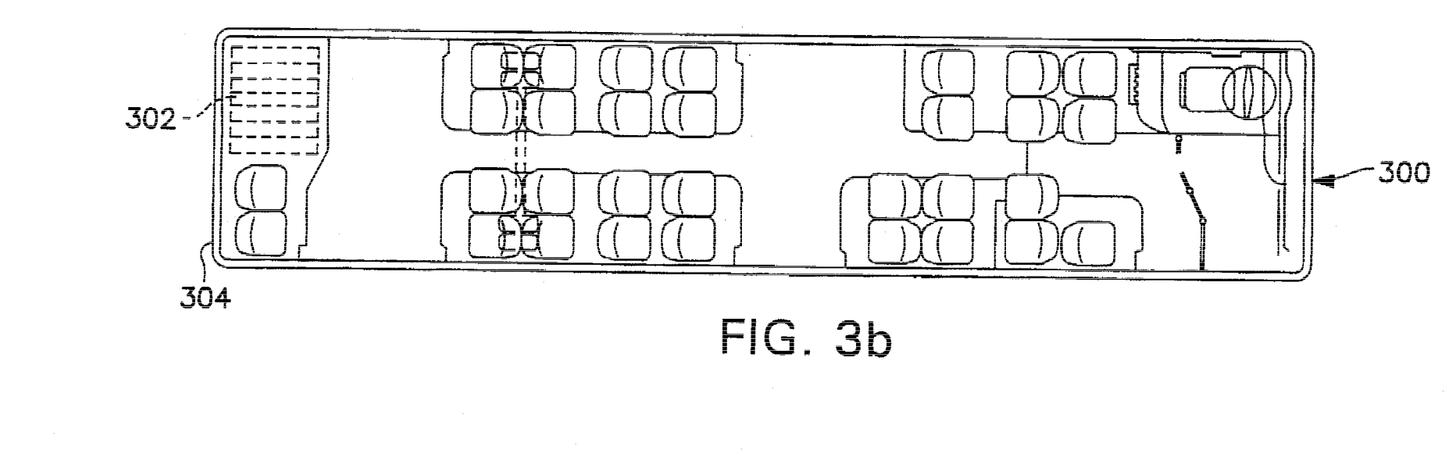

FIGS. 3a and 3b illustrate, respectively, another conventional urban transportation bus 300 in elevational and plan view, in which the present invention may be employed. Particularly, the bus 300 may include an internal combustion engine-electric generator unit 302 for powering individual motors associated with corresponding wheels or sets of wheels. In the bus 300 shown in FIGS. 3a and 3b, the internal combustion engine-electric generator unit 302 is shown as being positioned virtually directly adjacent the rear panel portion 304 of the bus 300, and behind a rearmost set of doors 306.

Further details of the functioning of an internal combustion engine-electric generator unit, in conjunction with individual drive motors for individual wheels, can be found in German Patent Application No. 41 33 013 A1 and in VDI-Berichte 878 (199), pages 611–622, both of which are incorporated herein by reference. Particularly, these documents discuss arrangements for controlling individual electric motors associated with corresponding wheels. Similar components and arrangements may also be found in the U.S. Patents listed towards the close of the instant specification.

It should be appreciated that the components discussed hereinabove with relation to FIGS. 1—3b may, if appropriate, be considered to be interchangeable with similar components discussed hereinbelow with relation to FIGS. 4 and 5.

Figure 4:
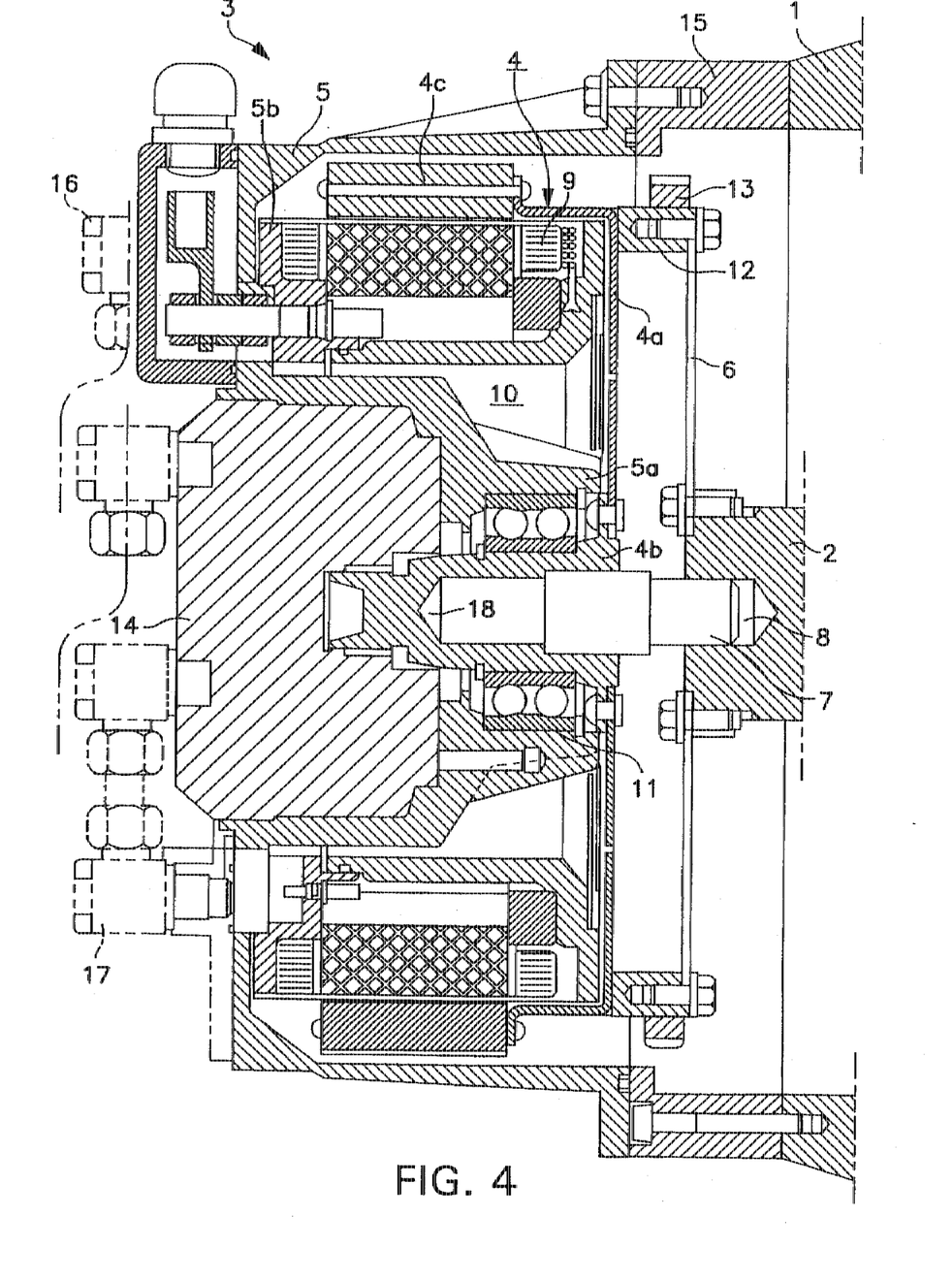
FIG. 4 illustrates an axial longitudinal section of a modular unit including an internal combustion engine and a generator.

The right side of FIG. 4 shows the internal combustion engine essentially only in the vicinity of the connection of its engine housing 1 and the crankshaft 2. The electric generator 3 preferably has a generator housing 5, a rotor 4 (such as an external rotor motor) and an internal stator with stator windings 9. The internal stator is preferably permanently connected to a portion 5b of the generator housing 5. The rotor 4 is preferably equipped with a number of alternately polarized permanent magnets 4c with high magnetic field strength.

Instead of a permanent magnet external rotor, there could theoretically also be a rotor with electromagnetic excitation. In this case, the commutation of the current in the stator windings 9 is preferably not done electromechanically, but by means of an electronic control system (not shown). It is also possible, although possibly not as desirable, to design the generator as a generator with an internal rotor, in which case the housing of the generator would likely essentially have to be modified correspondingly.

The generator housing 5 is preferably permanently bolted to the engine housing 1, not directly, but by means of an intermediate flange 15 bolted to the engine housing 1, with the intermediate flange 15 preferably projecting on the connection side to the left beyond the end of the crankshaft 2. This intermediate flange 15 can be advantageous because it can essentially eliminate the need for a corresponding extension of the generator housing 5 to the right or, alternatively, an extension of the engine housing 1 to the left. Consequently, it can thereby become possible to leave the connection side of the internal combustion engine, which internal combustion engine can also be used for vehicles with a conventional mechanical drive train (with a flanged connection of the transmission housing), unchanged, like the connection side of the generator housing 5 (which generator housing can preferably be essentially structurally identical to the housing of a corresponding electric motor which drives the wheels of the vehicle). In other words, this generator housing 5 can, in accordance with at least one preferred embodiment of the present invention, essentially represent one half of a housing of a symmetrically designed double motor (tandem motor), such as the one described in the above-referenced VDI-Berichte. The use of such an economically-manufactured intermediate flange 15 therefore can make it possible to continue to use conventional parts manufactured in large-scale series for the generator housing 5 and for the engine housing 1, and thus can contribute to a significant cost reduction, in particular in the case of the manufacture of relatively small series. On the other hand, for large-scale series production, it is possible that it may generally be more economical to make the generator housing in one piece.

The generator housing 5 preferably has an indentation 5a which extends from left to right into the space 10 enclosed by the stator windings 9. The permanent magnets 4c of the rotor 4 are preferably fastened to a rotor mount, or rotor bracket, or rotor holder, 4a preferably designed as a relatively thin-walled element in the form of a wheel (e.g. made of sheet metal). In the vicinity of the axis of rotation of the rotor 4, the rotor mount 4a is preferably permanently connected to a rotor hub 4b, which hub preferably extends from the plane of the right end surface of the rotor mount 4a to the left into the space 10 or, in other words, into a corresponding opening of the indentation 5a. The indentation 5a preferably extends to the vicinity of the surface of the rotor mount 4a.

The rotor hub 4a is preferably rotationally mounted inside the indentation 5a, preferably near the rotor mount 4a. In the illustrated example, the bearing 11 can preferably be designed as a double-row roller bearing, namely as a ball bearing. By means of corresponding stop collars, or locator flanges, and retaining rings, or lock washers, an axial locating bearing, or axial fixing bearing, can be formed. To guarantee an essentially precisely coaxial orientation with respect to the crankshaft 2, there are preferably centering holes 18 and 8 in the rotor hub 4b and in the crankshaft 2 respectively, each preferably coaxial to the axis of rotation, with a correspondingly shaped centering bolt 7 which is preferably inserted into each centering hole 18 and 8. Since the centering bolt 7 can essentially remain in the rotor hub 4b, it can essentially permanently orient the axis of rotation of the rotor 4. Therefore, the bearing 11 can also conceivably be designed as a single-row roller bearing. In many cases, the bearing 11 can also be designed as a floating bearing, or loose bearing, or disengaged bearing, or non-locating bearing.

In addition to a separate mounting of the rotor 4 inside the stator housing 5, which separate mounting may essentially not be necessary and is apparently the custom in the known arrangements, the present invention contemplates, in accordance with at least one preferred embodiment, that the rotor 4 not be coupled directly to the crankshaft 2 for the transmission of torque, but be connected by means of a torque transmission plate 6 which can be deformed elastically in the axial direction, such as the one known by the name "Flexplate". In the illustrated embodiment, the flexplate, or flexible plate, 6 can preferably essentially be in the form of a circular plate which is essentially permanently bolted to the end surface (driven end) of the crankshaft 2. On the circumference, flexplate 6 can preferably be bolted to a connecting element 12 permanently connected to the rotor mount 4a. For the case in which the generator 3 cannot be used as the starter for the internal combustion engine, it may be appropriate to provide a toothed rim 13 for the starter (not shown) on the outside of the connecting element 12. Of course, it would also be possible to design the rotor mount 4a so that the flexplate 6 could be bolted directly to it. But that could conceivably have the disadvantage that the same functional part as the one which is already present could essentially no longer be used as the rotor mount 4a for an essentially identical electric motor.

In accordance with at least one preferred embodiment of the present invention, flexplate 6 could essentially be embodied by a disc or plate-type member comprising any material suitable for providing the behavior discussed immediately above, that is, effective torque transmission capacity combined with an ability to deform elastically in the axial direction. Some types of such "flexplates" which may be appropriate for use in conjunction with the present invention may be found in the U.S. patents listed at the close of the instant specification. Additionally, another type of "flexplate" suitable for the purposes described herein is known to be manufactured by Mercedes Benz AG, 70322 Stuttgart, Federal Republic of Germany.

In accordance with at least one preferred embodiment of the present invention, the permanent connection of connecting element 12 with rotor mount 4a may preferably be achieved by any suitable medium, such as welding.

Since there may conceivably occur unavoidable decreases in efficiency during the operation of the generator, which efficiency decreases can possibly be expressed by an undesirable heating of the generator 3, it may be desirable, in accordance with at least one preferred embodiment of the present invention, to provide forced cooling. The reference numbers 17 and 16 therefore designate a forward motion of the coolant and a reverse motion of the coolant, respectively, of a liquid cooling system, the forced circulation of which can preferably be guaranteed by a coolant pump 14. This coolant pump 14 can preferably advantageously use the available inner portion of the indentation 5a of the generator housing 5 which extends into the space 10, since in this manner there can essentially be a direct drive by means of the crankshaft 2. The coolant circulation can therefore always preferably take place when the internal combustion engine, and thus of course also the generator 3, is running. For this purpose, the rotor hub 4a is preferably non-rotationally connected on its left free end to the drive shaft of the coolant pump 14, which drive shaft is preferably designed as a hollow shaft. For reasons of assembly and installation, a plug-in interlocking connection of the shafts is preferred. Such a plug-in interlocking connection may, in accordance with at least one preferred embodiment of the present invention, be achieved by a form-locking connection between the shafts in question.

The assembly and installation of the modular unit can be accomplished as follows. First, the intermediate flange 15 can preferably be bolted to the engine housing 1, and the flexplate 6 can preferably be bolted to the end of the crankshaft 2 by means of a corresponding connection flange. The generator 3, in accordance with at least one preferred embodiment of the present invention, will preferably already be available as a separately pre-assembled modular unit, i.e. the rotor 4 will preferably already be in its final position in the generator housing 5. After the insertion of the centering bolt 7, which can also be an immediate component of the rotor hub 4b or of the crankshaft 2, into the centering hole 18 or 8, the generator 3 is preferably oriented so that it is essentially precisely coaxial with the crankshaft 2 and is fastened to the intermediate flange 15 by means of bolts. In this manner, more complex measures for centering on the engine housing 1 or on the intermediate flange 15 become unnecessary. The centering bolt 7 can preferably remain in the generator 3 essentially as a lost assembly accessory. To bolt the flexplate 6 to the connecting element 12, the intermediate flange 15 and/or the engine housing 1 preferably has an opening (see FIG. 5), through which the fastening bolts can be accessible from outside. If the rotor hub 4b were to be designed totally as a hollow shaft, and if the inside diameter were to decrease from right to left, the centering bolt 7 (if its external contour were shaped in complementary fashion) could conceivably be extracted from the centering holes 8, 18 after the installation of the generator, and reused. In that case, however, it may first be necessary to install the coolant pump 14, if one was to be used.

To pre-assemble the generator 3, first the ball bearing 11 is preferably inserted in the corresponding hole of the indentation 5a of the generator housing 5 and fixed in place axially by means of a retaining ring. Then the rotor 4, including the rotor hub 4b, rotor mount 4a and permanent magnets 4c, is preferably pushed into the bearing 11 from the right side, and is then preferably axially secured from the left side by means of a retaining ring which sits on the rotor hub 4b, also preferably toward the left side. Then the coolant pump 14 can preferably be installed.

Figure 5:
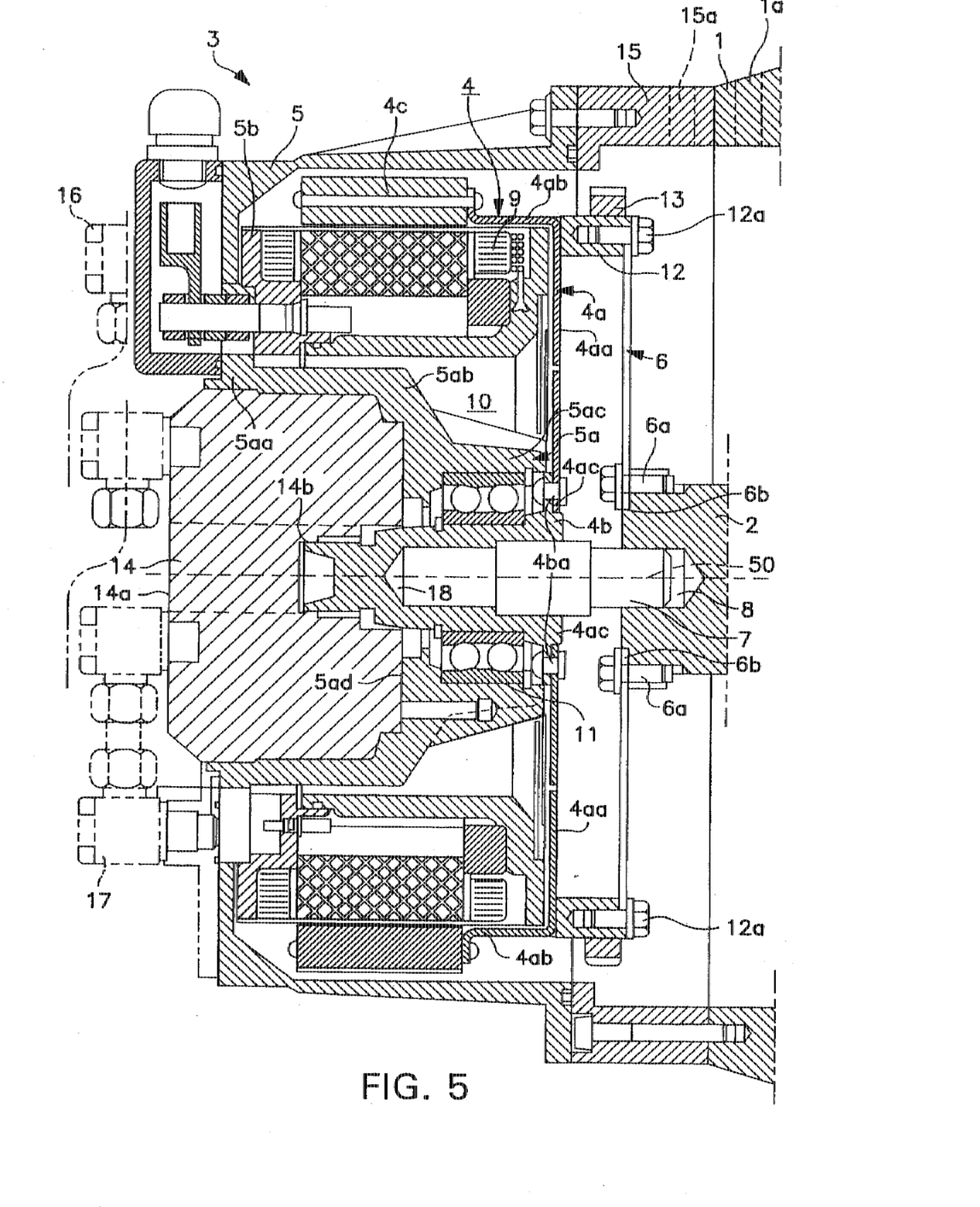
FIG. 5 is essentially the same view as FIG. 4, but more detailed.

FIG. 5 is essentially the same view as FIG. 4, but illustrates additional components.

In accordance with at least one preferred embodiment of the present invention, crankshaft 2, rotor 4, rotor hub 4b and coolant pump 14 will preferably have a common axis of rotation. This axis, hereinafter termed the "central axis", is indicated in FIG. 5 at 50.

As mentioned heretofore, either or both of internal combustion engine housing 1 and intermediate flange 15 may be provided with appropriately positioned and sized holes 1a and 15a, respectively, in order to allow tool access to bolts 12a connecting flexplate 6 with connecting element 12.

Further, in accordance with at least one preferred embodiment of the present invention, indentation 5a may preferably be embodied by an extension of housing 5 towards internal combustion engine housing 1 and crankshaft 2 in both an axial direction and a radial direction. As such, indentation 5a may preferably be embodied by: a first portion 5aa, which may be virtually parallel to the central axis 50 or be disposed at a significantly shallow angle, such as between about 1° and about 7°, with respect thereto; a second portion 5ab, extending from a terminal area of first portion 5aa radially inwardly, and axially towards internal combustion engine housing 1, at a virtual right angle with respect to the central axis 50 or at a significant acute angle, such as between about 70° and about 85°; and a third portion 5ac, being oriented to accommodate bearing 11 and rotor hub 4b radially inwardly therewithin and extending at an angle virtually parallel to the central axis 50. In accordance with at least one preferred embodiment of the present invention, on a side of the indentation 5a facing coolant pump 14, or the space for coolant pump 14, there may preferably be a surface 5ad that is generally perpendicular to the central axis 50.

In accordance with at least one preferred embodiment of the present invention, flexplate 6 will preferably be dimensioned such that it is essentially in the form of a disc, whereby the thickness of the disc constituting flexplate 6 is preferably substantially smaller than the diameter of the flexplate 6, the thickness being measured parallel to the central axis 50 and the diameter being measured with respect to the central axis 50. As a non-restrictive example, in accordance with at least one preferred embodiment of the present invention, flexplate 6 may preferably have a diameter-to-thickness ratio of between about 95:1 and 160:1. Preferably, flexplate 6 may also have a central aperture suitably dimensioned for connecting the flexplate 6 with the crankshaft 2 via bolts or other suitable connecting media 6a. The central aperture can preferably be defined radially within an inner periphery 6b of the flexplate 6. In accordance with at least one preferred embodiment of the present invention, the ratio of the outer diameter of flexplate 6 to the diameter of inner periphery 6b may preferably be between about 4:1 and about 6:1.

In accordance with at least one preferred embodiment of the present invention, rotor mount 4a may preferably include a first portion 4aa in the form of a wheel or disc, and a second portion 4ab extending therefrom essentially in the form of a flange. Accordingly, first portion 4aa may essentially be a circular disc-shaped element centered about the central axis 50 and disposed perpendicular with respect thereto, and second portion 4ab may preferably essentially be an annular element integral with first portion 4aa and extending from first portion 4aa in a direction away from internal combustion engine housing 1 and parallel to the central axis 50. The thickness of the disc constituting first portion 4aa of rotor 4a is preferably substantially smaller than the diameter of the first portion 4aa of rotor 4a, the thickness being measured parallel to the central axis 50 and the diameter being measured with respect to the central axis 50. As a non-restrictive example, in accordance with at least one preferred embodiment of the present invention, first portion 4aa of rotor 4a may preferably have a diameter-to-thickness ratio of between about 95:1 and 160:1. Preferably, first portion 4aa of rotor 4a may also have a central aperture suitably dimensioned for connecting the first portion 4aa of rotor 4a with the rotor hub 4b via rivets, bolts or other suitable connecting media 4ba. The central aperture can preferably be defined radially within an inner periphery 4ac of the first portion 4aa of rotor 4a. In accordance with at least one preferred embodiment of the present invention, the ratio of the outer diameter of first portion 4aa of rotor 4a to the diameter of inner periphery 4ac may preferably be between about 4:1 and about 6:1.

FIG. 5 schematically illustrates the general relative positioning of shaft 14a of coolant pump 14. Also shown schematically is the aforementioned interlocking, or form-looking, connection 14b between rotor hub 4b and shaft 14a.

Using the arrangements contemplated by the embodiments of the present invention, it can essentially be surprising that, not only can the desired simplification and increase in the quality of the final assembly of the modular unit be achieved, but in spite of what may be perceived as the effort and expense for the additional separate mounting of the rotor 4 in the generator housing 5 and the additional "flexplate 6" component, the manufacturing costs can also be reduced. This may be because the tolerance of the air gap between the permanent magnets and the poles of the stator windings 9 can be observed with significantly greater precision than in similar known devices. The result can essentially be a significant increase in the performance of the generator 3, which in turn can essentially result in a corresponding reduction of the amount of material required for otherwise equal performance, power, or efficiency) from the cost-intensive and high-grade material for the permanent magnets. In spite of what may be perceived as a potentially significantly higher cost on one hand, the overall solution can essentially be more economical, especially since the number of defects and errors in assembly and installation can be significantly reduced.

One feature of the invention resides broadly in the modular unit consisting of an internal combustion engine with an engine housing 1 and a crankshaft 2 for the power take-off, or torsional power take-off, or starting power take-off, and an electric generator/motor 3, the generator housing 5 of which is permanently connected to the engine housing 1, and the rotor 4 of which is coaxially and non-rotationally connected to the crankshaft 2, characterized by the fact that there is an elastically deformable torque transmission plate flexplate 6 which is permanently connected by means of a flange to the driven end of the crankshaft 2, and is permanently connected on the circumferential side to the rotor 4, and that the rotor 4 is rotationally mounted in the generator housing.

Another feature of the invention resides broadly in the modular unit characterized by the fact that the rotor 4 is designed as an external-rotor.

Yet another feature of the invention resides broadly in the modular unit characterized by the fast that the rotor 4 is equipped with permanent magnets 4c.

Still another feature of the invention resides broadly in the modular unit characterized by the fact that the rotor 4 has a preferably thin-walled rotor mount 4a in the form of a wheel, and a rotor hub 4b.

A further feature of the invention resides broadly in the modular unit characterized by the fact that the generator housing 5 has an indentation 5a which extends into the space 10 enclosed by the stator windings 9 of the generator 3, which indentation 5a extends from the end of the generator housing 5 opposite the rotor mount 4a.

Another feature of the invention resides broadly in the modular unit characterized by the fact that the indentation 5a extends to the vicinity of the rotor mount 4a.

Yet another feature of the invention resides broadly in the modular unit characterized by the fact that the bearing 11 of the rotor 4 is located in the indentation 5a in the vicinity of the rotor mount 4a.

Still another feature of the invention resides broadly in the modular unit characterized by the fact that the bearing 11 is designed as a locating bearing.

A further feature of the invention resides broadly in the modular unit characterized by the fact that the bearing 11 is designed as a double-row roller bearing, in particular as a double-row ball bearing.

Another feature of the invention resides broadly in the modular unit characterized by the fact that the bearing 11 is designed as a single-row roller bearing.

Yet another feature of the invention resides broadly in the modular unit characterized by the fact that the torque transmission plate 6 is bolted to the rotor 4 by means of a connecting element 12 which is permanently affixed to the rotor mount 4a.

Still another feature of the invention resides broadly in the modular unit characterized by the fact that the connecting element 12 is designed in the form of a ring and has a starter rim 13 on its outside.

A further feature of the invention resides broadly in the modular unit characterized by the fact that on the inside of the indentation 5a there is a coolant pump 14, the drive shaft of which is hollow and which is non-rotationally connected to the free end of the rotor hub 4b, preferably by means of an interlocking plug-in connection.

Another feature of the invention resides broadly in the modular unit characterized by the fact that the generator housing 5 is bolted to the engine housing 1 by means of an intermediate flange 15.

Yet another feature of the invention resides broadly in the modular unit characterized by the fact that centering holes 8, 18 are made in the crankshaft 2 and/or in the rotor hub 4b to locate a corresponding centering bolt 7.

Still another feature of the invention resides broadly in the modular unit characterized by the fact that the centering hole 18 in the rotor hub 4b is a continuous hole so that the centering bolt 7 can be extracted after the rotor 4 has been assembled and installed.

In recapitulation, the present invention, in accordance with at least one preferred embodiment, may relate to a modular unit which includes an internal combustion engine with an engine housing and a crankshaft for the power take-off, torsional power take-off, or starting power take-off, and an electric generator/motor, the generator housing of which is permanently connected to the engine housing, and the rotor of which is coaxially and non-rotationally connected to the crankshaft.

In further recapitulation, the present invention, in accordance with at least one preferred embodiment, may relate to a modular unit including an internal combustion engine with an engine housing and a crankshaft for power take-off, and an electric generator/motor, the generator housing of which is permanently connected to the engine housing, and the rotor of which is coaxially and non-rotationally connected to the crankshaft, wherein, according to at least one preferred embodiment of the present invention, the modular unit is characterized by the fact that there is an elastically deformable torque transmission plate which is permanently connected by means of a flange to the driven end of the crankshaft, and is permanently connected on the circumferential side to the rotor, and that the rotor is rotationally mounted in the generator housing.

Examples of flexplate components, which may be utilized in accordance with the embodiments of the present invention, may be found in the following U.S. patents: U.S. Pat. No. 5,323,665, which issued to Rediker on Jun. 28, 1994; U.S. Pat. No. 5,184,524, which issued to Senia on Feb. 9, 1993; U.S. Pat. No. 5,121,821, which issued to Poorman et al. on Jun. 16, 1992; and U.S. Pat. No. 4,672,867, which issued to Rodriguez on Jun. 16, 1987.

Examples of hybrid drive arrangements, such as internal combustion engine-electric generator arrangements, and components associated therewith such as control arrangements and individual motors for driving corresponding wheels, may be found in the following U.S. patents: U.S. Pat. No. 5,327,987, which issued to Abdelmalek on Jul. 12, 1994; U.S. Pat. No. 5,318,142, which issued to Bates et al. on Jun. 7, 1994; U.S. Pat. No. 5,301,764, which issued to Gardner on Apr. 12, 1994; U.S. Pat. No. 5,249,637, which issued to Heidl et al. on Oct. 5, 1993; U.S. Pat. No. 5,176,213, which issued to Kawai et al. on Jan. 5, 1993; U.S. Pat. No. 5,327,992, which issued to Boll on Jul. 12, 1994; U.S. Pat. No. 5,291,960, which issued to Brandenburg et al. on Mar. 8, 1994; and U.S. Pat. No. 5,264,764, which issued to Kuang on Nov. 23, 1993.

Examples of coolant pumps, which may be utilized in accordance with the embodiments of the present invention, may be found in the following U.S. patents: U.S. Pat. No. 4,643,135, which issued to Wunsche on Feb. 17, 1987; U.S. Pat. No. 4,677,943, which issued to Skinner on Jul. 7, 1987; U.S. Pat. No. 4,827,589, which issued to Friedriches on May 9, 1989; U.S. Pat. No. 4,886,989, which issued to Britt on Dec. 12, 1989; and U.S. Pat. No. 4,728,840, which issued to Newhouse on Mar. 1, 1988.

The appended drawings in their entirety, including all dimensions, proportions and/or shapes in at least one embodiment of the invention, are accurate and to scale and are hereby included by reference in this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 04 791.6, filed on Feb. 8, 1994, having inventors Dieter Lutz and Franz Naglet, and DE-OS P 44 04 791.6 and DE-PS P 44 04 791.6, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hybrid drive in a motor vehicle, the motor vehicle comprising:
   a chassis;
   a plurality of wheels being rotationally mounted on the chassis;
   motor means for driving the wheels to propel the motor vehicle;
   said hybrid drive being for powering the motor means of the motor vehicle, and said hybrid drive comprising:
   generator means for generating power to drive the motor means of the motor vehicle;
   said generator means comprising a housing and rotor means being rotationally disposed within said housing;
   internal combustion engine means for powering said generator means;
   said internal combustion engine means comprising an output shaft for transmitting power from said internal combustion engine means to said generator means;
   means connecting said output shaft with said rotor means to transmit power from said output shaft to said rotor means;
   said connecting means comprising a disc connected between said output shaft and said rotor means;
   said disc being configured for minimizing, in response to non-rotational displacement of said shaft, non-rotational displacement of said rotor means;
   said rotor, said disc and said output shaft having a common axis of rotation;
   said disc having a thickness dimension defined parallel to the common axis of rotation;
   said disc having an outer diameter defined with respect to the common axis of rotation; and
   the thickness dimension of said disc being very substantially smaller than the outer diameter of said disc.

2. The hybrid drive according to claim 1, wherein said disc is configured for transmitting power from said output shaft to said rotor means via the transmission of torque from said output shaft to said rotor means;
   said disc elastically deformable in a direction parallel the common axis of rotation; and
   said disc is configured for minimizing, in response to non-rotational displacement of said shaft, non-rotational displacement of said rotor means, vie elastic deformation of said disc in a direction parallel to the common axis of rotation.

3. The hybrid drive according to claim 2, wherein:
   said output shaft has a driven end;
   said connecting means comprises:
     first connecting means, for connecting said driven end of said output shaft with said disc; and
     second connecting means, for connecting said disc with said rotor means;
   said rotor means having an outer peripheral region disposed maximally away from the common rotational axis; and
   said second connecting means being disposed to connect said disc with said rotor means at said outer peripheral region of said rotor means.

4. The hybrid drive according to claim 3, wherein:
   said generator constitutes a pre-assembled unit, said pre-assembled unit comprising said housing and said rotor means being rotationally disposed within said housing.

5. The hybrid drive according to claim 4, wherein:
   said internal combustion engine means comprises a housing disposed about said output shaft, said output shaft being rotationally disposed within said housing of said internal combustion engine means;
   said housing of said internal combustion engine means is fixedly connected with said housing of said generator means.

6. The hybrid drive according to claim 5, wherein:
   said rotor means is in the form of an external-rotor;
   said rotor means comprises a plurality of permanent magnets; and
   said rotor means comprises a rotor hub and a rotor mount, said rotor hub being rotationally disposed with respect to the common rotational axis, said rotor mount comprising a disc-shaped portion extending radially away from said rotor hub, said disc-shaped portion of said rotor mount having a thickness dimension and an outer diameter, the thickness dimension of said rotor mount being very substantially smaller than the outer diameter of said rotor mount.

7. The hybrid drive according to claim 6, wherein:
   said housing of said generator means comprises an outer peripheral portion and an end portion, said end portion being disposed maximally away from said internal combustion engine means, said outer peripheral portion being disposed maximally away from the common rotational axis;
   said end portion extending radially inwardly from said outer peripheral portion;
   said housing of said generator means further comprising an inward projection portion projecting axially towards said internal combustion means and generally radially inwardly from said outer peripheral portion;
   said generator means comprises stator windings disposed about the common rotational axis; and
   said inward projection portion being disposed radially within said stator windings, with respect to the common rotational axis.

8. The hybrid drive according to claim 7, wherein said inward projection portion extends axially from said end portion to the vicinity of said rotor mount.

9. The hybrid drive according to claim 8, wherein:
   said generator means comprises bearing means for rotationally bearing said rotor hub with respect to said housing of said generator means;
   said bearing means being disposed radially within said inward projection portion and in the vicinity of said rotor mount.

10. The hybrid drive according to claim 9, wherein:
said bearing means is an axial fixing bearing;
said bearing means comprises one of:
   a double-row ball bearing; and
   a single-row roller bearing.

11. The hybrid drive according to claim 10, wherein said second connecting means comprises a connecting element being permanently affixed to said rotor mount.

12. The hybrid drive according to claim 11, wherein:
said connecting element comprises:
   an annular connecting portion for connecting said disc with said rotor mount; and
   a toothed rim disposed radially outwardly of said annular connecting portion, for connecting with a starter for starting said internal combustion engine means.

13. The hybrid drive according to claim 12, further comprising:
   a coolant pump for cooling said generator means, said coolant pump being disposed radially within said inward projection portion of said housing of said generator means;
   said coolant pump having a drive shaft for powering said coolant pump;
   said drive shaft of said coolant pump having an axis of rotation common with the common axis of rotation;
   said hub having a free end disposed axially away from said rotor mount and said internal combustion engine means; and
   said drive shaft being fixedly connected, by means of an interlocking connection, to said free end of said rotor hub.

14. The hybrid drive according to claim 13, wherein:
said drive shaft of said coolant pump is hollow;
said hybrid drive comprises third connecting means, for connecting said housing of said generator means with said housing of said internal combustion engine means;
said third connecting means comprising an intermediate flange, said intermediate flange being an intermediate component, annular in shape, centered about the common axis of rotation;
said third connecting means comprising means for connecting said intermediate flange with each of said housing of said generator means and said housing of said internal combustion engine means;
said output shaft and said rotor hub each comprise a corresponding centering hole for accommodating a centering bolt, said centering bolt being configured for centering said output shaft and said rotor hub with respect to each other and to the common axis of rotation;
said centering hole of said rotor hub being a continuous hole to permit the extraction of said centering bolt after the rotor has been assembled and installed;
the ratio of the thickness dimension of said disc to the outer diameter of said disc being between about 95:1 and 160:1 and
the ratio of the thickness dimension of said disc-shaped portion of said rotor mount to the outer diameter of said rotor mount being between about 95:1 and 160:1.

15. Hybrid drive for a motor vehicle, such a motor vehicle comprising:
a chassis;
a plurality of wheels being rotationally mounted on the chassis;
motor means for driving the wheels to propel the motor vehicle;
said hybrid drive being for powering the motor means of the motor vehicle, and said hybrid drive comprising:
   generator means for generating power to drive the motor means of the motor vehicle;
   said generator means comprising a housing and rotor means being rotationally disposed within said housing;
   internal combustion engine means for powering said generator means;
   said internal combustion engine means comprising an output shaft for transmitting power from said internal combustion engine means to said generator means;
   means connecting said output shaft with said generator means to transmit power from said output shaft to said generator means;
   said connecting means being configured for minimizing, in response to non-rotational displacement of said shaft, non-rotational displacement of said rotor means;
   said connecting means comprising a disc connected between said output shaft and said rotor means;
   said disc comprising means for minimizing, in response to non-rotational displacement of said shaft, non-rotational displacement of said rotor means;
   said rotor, said disc and said output shaft having a common axis of rotation;
   said disc having a thickness dimension defined parallel to the common axis of rotation;
   said disc having an outer diameter defined with respect to the common axis of rotation;
   the thickness dimension of said disc being very substantially smaller than the outer diameter of said disc;
   said disc being configured for transmitting power from said output shaft to said rotor means via the transmission of torque from said output shaft to said rotor means;
   said disc being elastically deformable in a direction parallel to the common axis of rotation; and
   said disc being configured for minimizing, in response to non-rotational displacement of said shaft, non-rotational displacement of said rotor means, via elastic deformation of said disc in a direction parallel to the common axis of rotation.

16. The hybrid drive according to claim 15, wherein:
said output shaft has a driven end;
said connecting means comprises:
   first connecting means, for connecting said driven end of said output shaft with said disc; and
   second connecting means, for connecting said disc with said rotor means;
said rotor means having an outer peripheral region disposed maximally away from the common rotational axis;
said second connecting means being disposed to connect said disc with said rotor means at said outer peripheral region of said rotor means;
said generator constitutes a pre-assembled unit, said pre-assembled unit comprising said housing and said rotor means being rotationally disposed within said housing;
said internal combustion engine means comprises a housing disposed about said output shaft, said output shaft being rotationally disposed within said housing of said internal combustion engine means; and said housing of said internal combustion engine means is fixedly connected with said housing of said generator means.

17. The hybrid drive according to claim 15, wherein:

said rotor means is in the form of an external-rotor;

said rotor means comprises a plurality of permanent magnets;

said rotor means comprises a rotor hub and a rotor mount, said rotor hub being rotationally disposed with respect to the common rotational axis, said rotor mount comprising a disc-shaped portion extending radially away from said rotor hub, said disc-shaped portion of said rotor mount having a thickness dimension and an outer diameter, the thickness dimension of said rotor mount being very substantially smaller than the outer diameter of said rotor mount;

said housing of said generator means comprises an outer peripheral portion and an end portion, said end portion being disposed maximally away from said internal combustion engine means, said outer peripheral portion being disposed maximally away from the common rotational axis;

said end portion extending radially inwardly from said outer peripheral portion;

said housing of said generator means further comprising an inward projection portion projecting axially towards said internal combustion means and generally radially inwardly from said outer peripheral portions;

said generator means comprises stator windings disposed about the common rotational axis;

said inward projection portion being disposed radially within said stator windings, with respect to the common rotational axis;

said inward projection portion extends axially from said end portion to the vicinity of said rotor mount;

said generator means comprises bearing means for rotationally bearing said rotor hub with respect to said housing of said generator means;

said bearing means being disposed radially within said inward projection portion and in the vicinity of said rotor mount;

said bearing means is an axial fixing bearing;

said bearing means comprises one of:
 a double-row ball bearing; and
 a single-row roller bearing;

said second connecting means comprises a connecting element being permanently affixed to said rotor mount;

said connecting element comprises:

an annular connecting portion for connecting said disc with said rotor mount; and a toothed rim disposed radially outwardly of said annular connecting portion, for connecting with a starter for starting said internal combustion engine means;

said hybrid drive further comprises a coolant pump for cooling said generator means, said coolant pump being disposed radially within said inward projection portion of said housing of said generator means;

said coolant pump having a drive shaft for powering said coolant pump;

said drive shaft of said coolant pump having an axis of rotation common with the common axis of rotation;

said hub having a free end disposed axially away from said rotor mount and said internal combustion engine means;

said drive shaft being fixedly connected, by means of an interlocking connection, to said free end of said rotor hub;

said drive shaft of said coolant pump is hollow;

said hybrid drive comprises third connecting means, for connecting said housing of said generator means with said housing of said internal combustion engine means;

said third connecting means comprising an intermediate flange, said intermediate flange being an intermediate component, annular in shape, centered about the common axis of rotation;

said third connecting means comprising means for connecting said intermediate flange with each of said housing of said generator means and said housing of said internal combustion engine means;

said output shaft and said rotor hub each comprise a corresponding centering hole for accommodating a centering bolt, said centering bolt being configured for centering said output shaft and said rotor hub with respect to each other and to the common axis of rotation;

said centering hole of said rotor hub being a continuous hole to permit the extraction of said centering bolt after the rotor has been assembled and installed;

the ratio of the thickness dimension of said disc to the outer diameter of said disc being between about 95:1 and 160:1; and the ratio of the thickness dimension of said disc-shaped portion of said rotor mount to the outer diameter of said rotor mount being between about 95:1 and 160:1.

\* \* \* \* \*

UNITED STATES PATENT AND TRADEMARK OFFICE
CERTIFICATE OF CORRECTION

PATENT NO. : 5,713,427
DATED : February 3, 1998
INVENTOR(S) : Dieter LUTZ and Franz NAGLER It is certified that error appears in the above-indentified patent and that said Letters Patent is hereby corrected as shown below:

On the title page, item [56], following the FOREIGN PATENT DOCUMENTS section, insert the following new section:

--OTHER DOCUMENTS

VDI-Bericht 878 (1991), pgs. 611-622.--.

In column 11, line 6, after 'Franz', delete "Naglet," and insert --Nagler,--.

In column 11, line 65, Claim 2, after 'means,', delete "vie" and insert --via--.

In column 15, line 4, Claim 17, after 'claim', delete "15," and insert --16,--.

In column 15, line 29, Claim 17, after 'peripheral', delete "portions;" and insert --portion;--.

Signed and Sealed this

Twenty-eighth Day of September, 1999

Q. TODD DICKINSON

*Attest:*

*Attesting Officer*     Acting Commissioner of Patents and Trademarks